United States Patent [19]
Davis et al.

[11] Patent Number: 5,459,843
[45] Date of Patent: Oct. 17, 1995

[54] RISC-TYPE PIPELINE PROCESSOR HAVING N SLOWER EXECUTION UNITS OPERATING IN PARALLEL INTERLEAVED AND PHASE OFFSET MANNER WITH A FASTER FETCH UNIT AND A FASTER DECODER

[75] Inventors: Gordon T. Davis, Raleigh, N.C.; Sebastian T. Ventrone, Jericho; John J. Reilly, Huntington, both of Vt.; Baiju D. Mandalia; Michael G. Holung, both of Boca Raton, Fla.; William R. Robinson, Jr., West Palm Beach, Fla.

[73] Assignee: International Business Machines Corporation, Armonk, N.Y.

[21] Appl. No.: 282,412

[22] Filed: Jul. 28, 1994

Related U.S. Application Data

[63] Continuation of Ser. No. 800,933, Nov. 26, 1991, abandoned.

[51] Int. Cl.⁶ .................. G06F 9/30; G06F 9/38
[52] U.S. Cl. ................ 395/375; 364/DIG. 1; 364/231.8; 364/232.23; 364/246.4; 364/271.6
[58] Field of Search ................. 395/375, 550, 395/800

[56] References Cited

U.S. PATENT DOCUMENTS

| | | | |
|---|---|---|---|
| 3,866,523 | 5/1975 | Ferguson et al. | 493/19 |
| 4,295,193 | 10/1981 | Pomerene | 395/375 |
| 4,476,525 | 10/1984 | Ishii | 395/375 |
| 4,493,019 | 1/1985 | Kim et al. | 395/375 |
| 4,569,016 | 2/1986 | Hao et al. | 395/375 |
| 4,589,065 | 5/1986 | Auslander et al. | 395/575 |
| 4,675,806 | 6/1987 | Uchida | 395/375 |
| 4,734,852 | 3/1988 | Johnson et al. | 395/250 |
| 4,752,873 | 6/1988 | Shonai et al. | 395/800 |
| 4,766,566 | 8/1988 | Chuang | 395/375 |
| 4,809,171 | 2/1989 | Dozier et al. | 395/325 |
| 4,858,105 | 8/1989 | Kuriyama et al. | 395/375 |
| 4,928,226 | 5/1990 | Kamada et al. | 395/375 |
| 4,942,525 | 7/1990 | Shintani et al. | 395/375 |
| 5,202,967 | 4/1993 | Matsuzaki et al. | 395/375 |

FOREIGN PATENT DOCUMENTS

0291613A1  11/1988  European Pat. Off. .

OTHER PUBLICATIONS

Hwang et al., 3.3.2 "Data Buffering and Busing Structures", Computer Architecture and Parallel Processing, McGraw-Hill, p. 193, 1984.

Lee et al., "Pipeline Interleaved Programmable DSP's: Architecture," IEE Trans. on Acoustics, Speec, and Signal Processing, vol. ASSP-35, No. (, pp. 1320-1333, Sep. 1987.

Farrens et al., "Strategires for Achieving Improved Processor Throughout," Computer Architecture News, vol. 19, No. 3, pp. 362-369, May 1991.

*Primary Examiner*—Krisna Lim
*Attorney, Agent, or Firm*—Heslin & Rothenberg

[57] ABSTRACT

A pipelined, RISC-type processor operated in parallel mode and its associated processing methods for separately handling instructions from multiple program instruction sets. The pipelined processor includes an instruction fetch unit, an instruction decode unit and n execution units. Each execution unit operates at substantially the same process cycle time, while the speed of operation of the instruction fetch unit and instruction decode unit is at least n times the cycle time of the execution units such that each phase of the pipeline separately processes n instructions substantially within one machine cycle. Timing and control circuitry is coupled to each of the principle elemental units for controlling the timing and sequence of operations on instructions.

16 Claims, 7 Drawing Sheets fig.1 fig. 2 fig. 3 fig. 4 fig. 5 fig. 6 fig. 7 fig. 8

RISC-TYPE PIPELINE PROCESSOR HAVING N SLOWER EXECUTION UNITS OPERATING IN PARALLEL INTERLEAVED AND PHASE OFFSET MANNER WITH A FASTER FETCH UNIT AND A FASTER DECODER

This is a continuation of application Ser. No. 07/800,933 filed Nov. 26, 1991, now abandoned.

TECHNICAL FIELD

The present invention relates generally to reduced instruction set computer (RISC) architectures and, more particularly, to enhancing performance of pipelined RISC-type processors operated in parallel mode and to associated processing methods.

BACKGROUND ART

Many reduced instruction set computer (RISC) processors known in the open art are based on the pipeline principle, wherein the function of the processor is divided into certain basic phases, or units. Pipelining techniques are especially well known in digital signal processor (DSP) technology. A pipeline processor enhances execution speed by separating the instruction processing function into at least three pipeline phases. This phase division allows an instruction to be fetched, while a previous instruction is decoded, and an instruction before that is executed. Each phase of the pipeline normally requires one process cycle to complete, such that the total elapsed time to process (i.e., fetch, decode and execute) a single instruction is three machine cycles. However, the average throughput is one instruction per machine cycle because of the concurrent nature of operations of the three pipelined phases.

Once a pipeline is full, processor performance is limited by the phase which requires the longest to complete. In pipeline processing, this is usually the execute phase. Accordingly, the processor normally has excess time in both the fetch phase and the decode phase. The present invention attempts to maximize utilization of all processor phases.

Previous attempts have been made in the art to improve RISC-type processor performance. One approach has been to change the technology used in implementing the processor, so that the processor operates at a higher clock frequency. However, changing from established technology can entail substantial risks, and consume substantial time and resources by requiring adaption of existing architecture to new technology. In addition, even after converting to a new technology, the faster processor phases will still have excess, unused time.

Another known technique to increasing processor speed is to enhance the processor's instruction set with faster instructions. However, adding faster instructions requires the coding of software to utilize these instructions. If a large software application base already exists for the processor, then it is unlikely that the software will be recoded to use the new, faster instructions because of the time and expense which would be involved. In addition, such changes often make the software programs incompatible with older machines. In any event, this approach does not solve the intrinsic problem of the pipelined processor having excess, unused time in the faster phases.

Therefore a new RISC-type, pipelined processor which increases instruction throughput without changing technology or requiring a more complex instruction set, yet maximizes utilization of all processor phases, is needed in the art. The present invention provides such a processor and its associated processing methods.

DISCLOSURE OF INVENTION

Briefly described, this invention comprises in one principal aspect a reduced instruction set computer for substantially parallel, pipelined processing of multiple instructions from n program instruction sets. The RISC-type computer includes an instruction fetch unit for fetching computer instructions from each of the n instruction sets and an instruction decode unit for decoding fetched instructions. A plurality n of execute units are coupled in parallel to execute instructions decoded by the decode unit. Each of the n execute units has substantially the same cycle time and each executes only decoded instructions from a corresponding one of the n instruction sets. A timing and control circuit is coupled to the instruction fetch unit, instruction decode unit and n execution units for controlling the timing and sequence of operations on instructions from the n instruction sets such that multiple instructions are separately handled by the instruction fetch unit and the instruction decode unit each within a cycle time equal to the cycle time of the parallel connected execute units. Additional features of the RISC-type architecture are also described and claimed herein.

In another aspect, the present invention comprises a novel method for processing instructions through a pipelined processor having at least fetch, decode and execute phases, the execute phase being accomplished using n parallel connected execute units, each of which operates with the same cycle time. The method includes the steps of: fetching a series of n instructions; decoding the fetched series of n instructions while simultaneously fetching another series of n instructions; using the n execute units to execute the decoded series of n instructions while simultaneously the another series of n instructions and fetching a new series of n instructions, the executing being accomplished such that the n execute units each only execute one of the decoded n instructions; using the n execute units to execute the decoded another series of n instructions while simultaneously decoding the new series of n instructions and fetching another new series of instructions, again such that each of the execute units is only used to execute one instruction from the decoded series of n instructions; and repeating the executing steps for a plurality of instruction series and accomplishing the fetching and decoding steps at n times the operating cycle time of the execute units such that the instructions are separately processed in parallel pipeline fashion.

To summarize, by providing multiples of the slowest elemental units in a RISC-type architecture, with outputs interleaved to the next non-duplicated element in the pipeline, significantly enhanced processing performance is obtained. This processing enhancement is possible using a similar basic processor configuration and the same technology with the same instruction set as prior art RISC-type processors. Further, these increased speeds are obtained with substantially less than an otherwise corresponding increase in silicon area. In one actual implementation of the invention, for example, twice the speed is achieved with only a fifty percent increase in silicon.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

Reference is now made to the drawings in which the same reference numbers are used throughout the different figures to designate the same or similar components.

Figure 1:
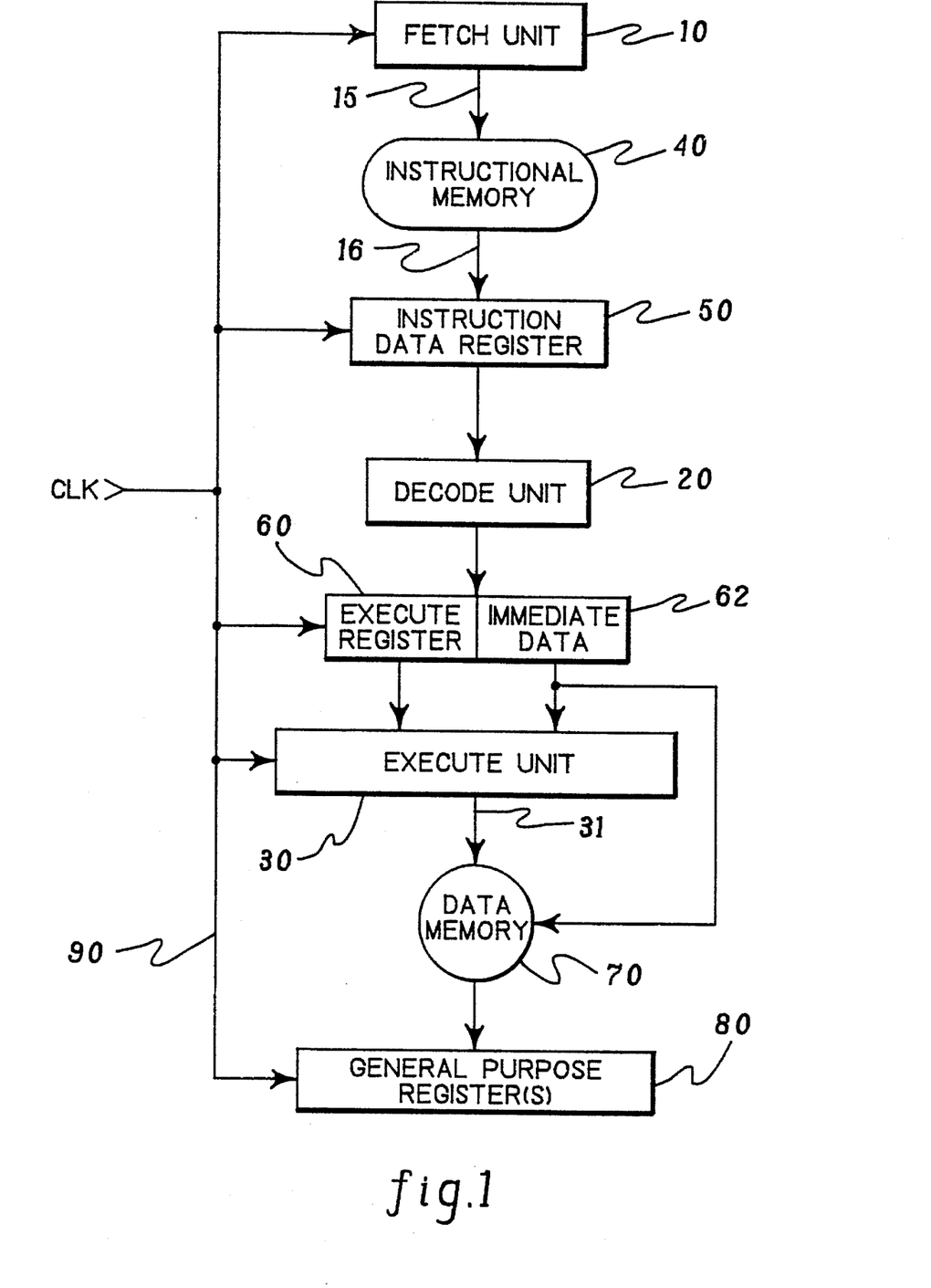
FIG. 1 is a block diagram of certain essential elements of a conventional single processor, 3-phase RISC-type architecture.
Figure 2:
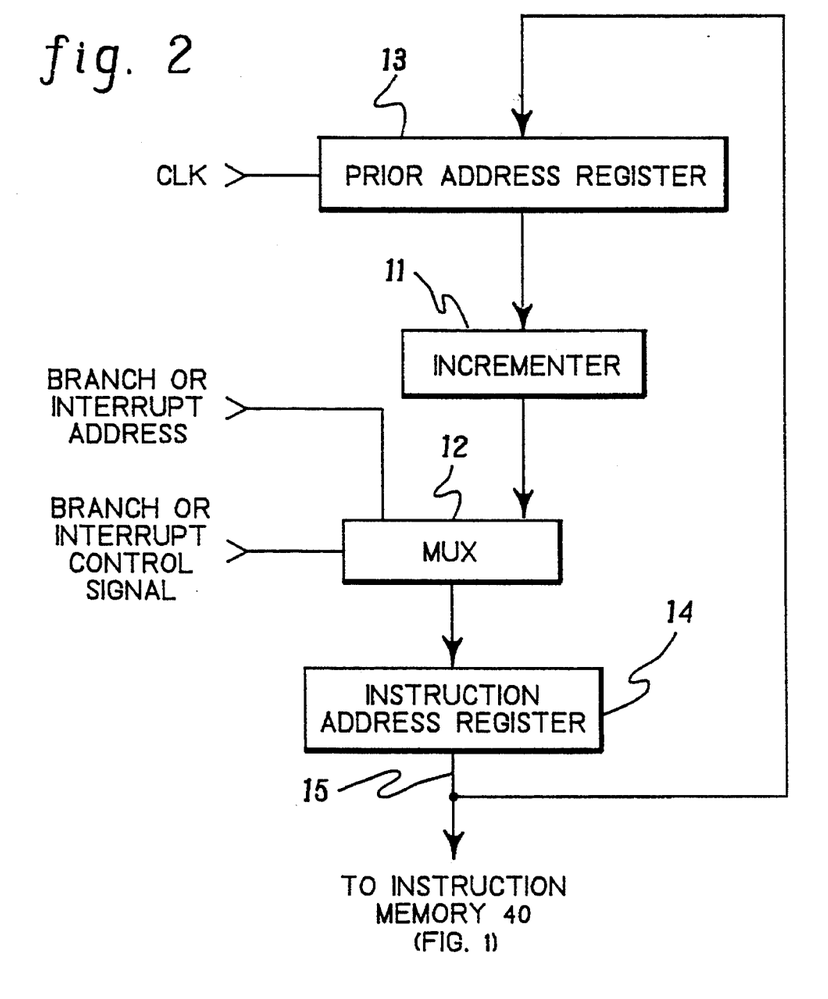
FIG. 2 is a more detailed block diagram of the fetch unit of FIG. 1.

FIG. 1 is a block diagram of certain essential elements in a prior art RISC-type pipeline processor. The elemental units include a fetch unit 10, a decode unit 20, and an execute unit 30. Fetch unit 10 generates an address for accessing instruction data, which is normally stored in memory external to the processor. A typical fetch unit 10 is shown in FIG. 2 to include a sequencer or incrementer 11, which in the case of serial instruction execution operates to increment a prior address to a current address. The output of incrementer 11 and the output of an address generator (not shown) in decode unit 20 (FIG. 1) are provided as inputs to a multiplexer 12, the output of which is provided to the input of an instruction address register 14. From register 14, address instructions are sent to the input of an instruction memory 40 (FIG. 1) via an instruction address bus (IAB) 15 and to a prior address register 13. Register 13 is clocked by a clock CLK from processor timing and control logic (not shown). Depending upon the operation to be performed, the multiplexer selects between the address output from incrementer 11 and the branch or interrupt address output from the address generator in decode unit 20 (FIG. 1). For example, if a branch address has been generated, then an appropriate branch control signal is provided to multiplexer 12 to ensure selection of the generated address for output to instruction address register 14.

Returning to FIG. 1, the instruction address output from unit 10 on bus 15 is used to read corresponding instruction data from instruction memory 40. The read data is returned to the pipelined processor via an instruction data bus (IDB) 16 and, in particular, to an instruction data register 50. In the next processing phase, stored data is read from register 50 by decode unit 20. Assuming that data latched in register 50 is execute data, it is output directly to an execute register 60. The state (1 or 0) of the various bits of execute data register 60 determine activation, or not, of control lines (not shown) from decode unit 20 to execute unit 30. In addition, execute register 60 can contain immediate data 62 as a subpart thereof, which can be fed directly to execute unit 30 (or to a data memory 70) for use as such or for use in generating an address by a data address generation function resident in unit 30.

During a write operation, execute unit 30 outputs a data address and associated data for storage into data memory 70. This information is typically sent across a common address bus (CAB) and a common data bus (CDB), together denoted 31. For a read operation, execute unit 30 only outputs a data address across the CAB, and the corresponding data is read from data memory 70 over the CDB to a general purpose register(s) 80, which is actually located within execute unit 30.

Sequencing of the operations described above is controlled by timing and control logic (not shown). This is accomplished in part through a clock timing line 90 which provides the necessary clocking signals for fetch unit 10, instruction data register 50, execute register 60, and execute unit 30, including general purpose register(s) 80. Typically, data is latched in each of these elements in a dual latch structure frequently referred to as an L1/L2 latch. Thus, the CLK signal on line 90 is actually two separate clock signals provided on two different clock lines, which deliver the appropriate phase clocks to the L1 and L2 latches for the transfer and latching of data.

Figure 3:
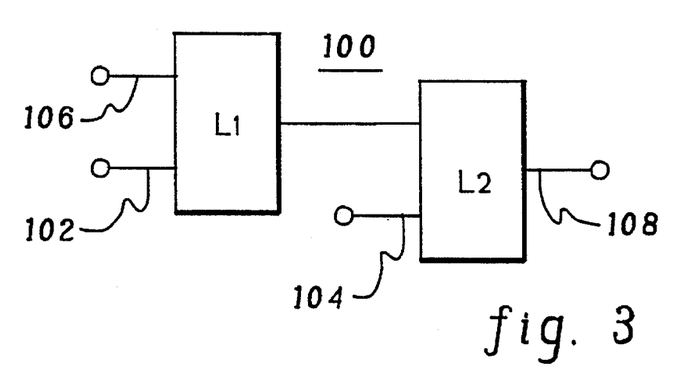
FIG. 3 is a block diagram of conventional L1/L2 latch circuitry used in the transfer and latching of data within RISC-type architectures.
Figure 4:
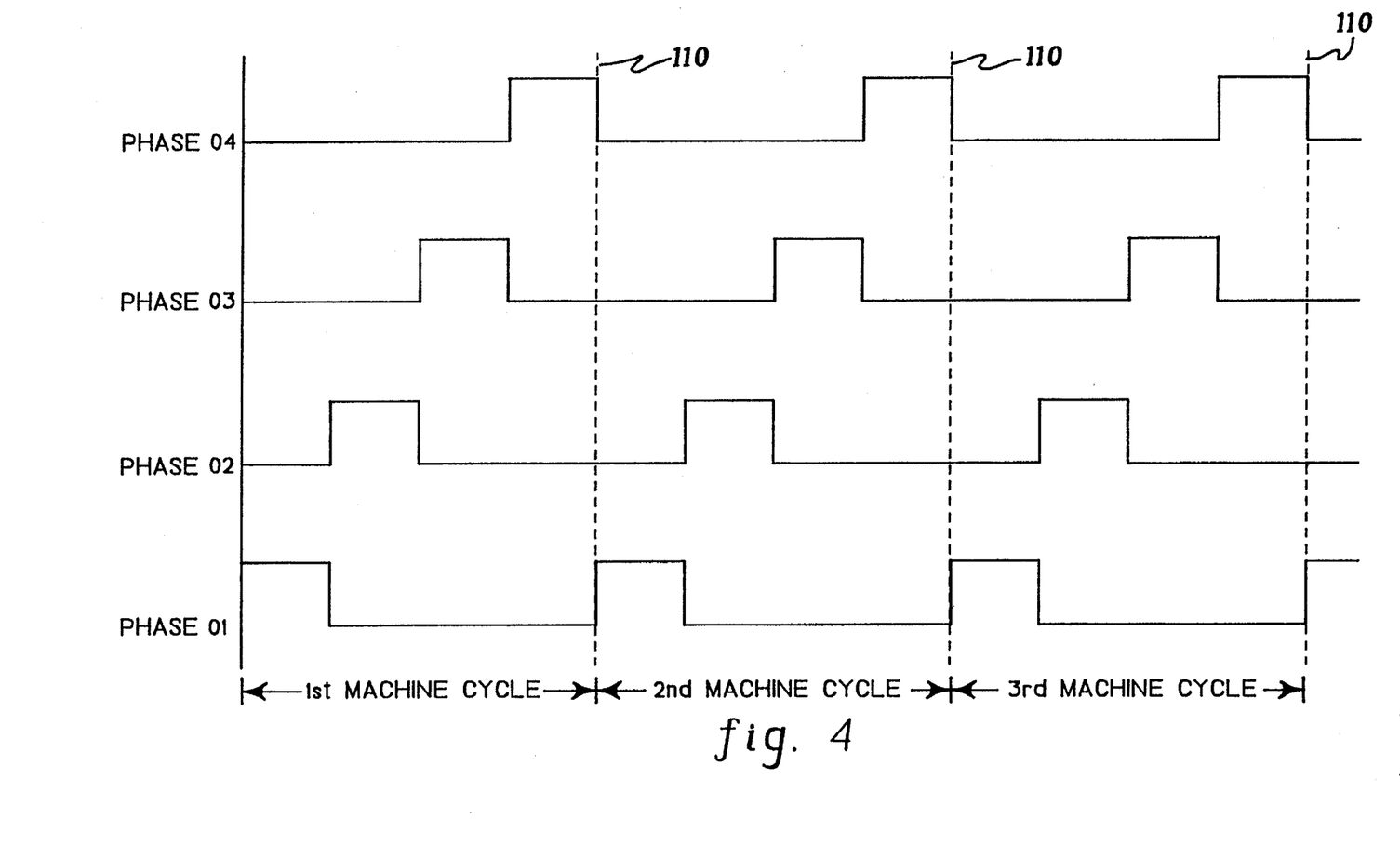
FIG. 4 is a timing diagram of a four phase clocking scheme.

FIG. 3 is a diagram showing a typical L1/L2 latch 100. The L1 latch, which captures data, is triggered by an L1 clock provided on input line 102, while the L2 latch, which launches data into subsequent logic, is triggered by an L2 clock provided on input line 104. Data is provided to the L1 latch on line 106 and data is output from latch L2 on line 108. In a typical implementation, a master clock CLK is divided into four equal phases, which may be denoted phases 01–04. FIG. 4 is a diagram showing such a four phase clock scheme. Machine cycle divisions of the master clock are depicted by dashed lines 110. For a latch structure such as that shown in FIG. 3, the phase 01 clock can be provided as the L2 clock input on line 104, while the phase 04 clock can be provided as the L1 clock input on line 102.

In contrast to the typical RISC-type architecture described above, the present invention comprises an interleaved RISC-type parallel pipeline processor. Essentially, the same silicon circuitry is utilized in interleaved simultaneous fashion by at least two integrated processing engines. Conceptually, however, the invention is broader. Specifically, processing through a RISC-type pipeline architecture having a plurality of elemental units, including at least a fetch unit, a decode unit and an execution unit, is improved pursuant to the present invention by operating the slower of the elemental units in at least duplicate, parallel configuration. The at least duplicate, parallel configured elemental unit is operated at a fraction of the speed of the other elemental units not provided in duplicate configuration. For example, if the decode phase is at least three times slower than the fetch unit, then processing can be improved by coupling three decode units in parallel to receive the output from the single, faster fetch unit. In this way, maximum usage is made of each unit in the pipeline, thereby significantly improving processing performance without dictating an increase in silicon usage in direct correspondence. The claims appended hereto are intended to encompass this general concept.

Because the longest phase in conventional pipeline processing is normally the execution phase, and since the fetch and decode phases have been found to each require less than half the time of the execution phase, the novel timing and sequencing approach described herein can be used to maximize processing performance. In the interleaved RISC-type pipeline architecture embodiment depicted herein, two execution units are integrated with essentially one fetch unit and one decode unit. Substantially simultaneous processing through the execution units is accomplished by interleaving the processing engines, i.e., overlapping the processing cycles. Essentially, the two processors are timed 180° out of phase, but when averaged over time performance shows a twofold increase. This is accomplished with only approximately a fifty percent increase in silicon area.

Figure 5:
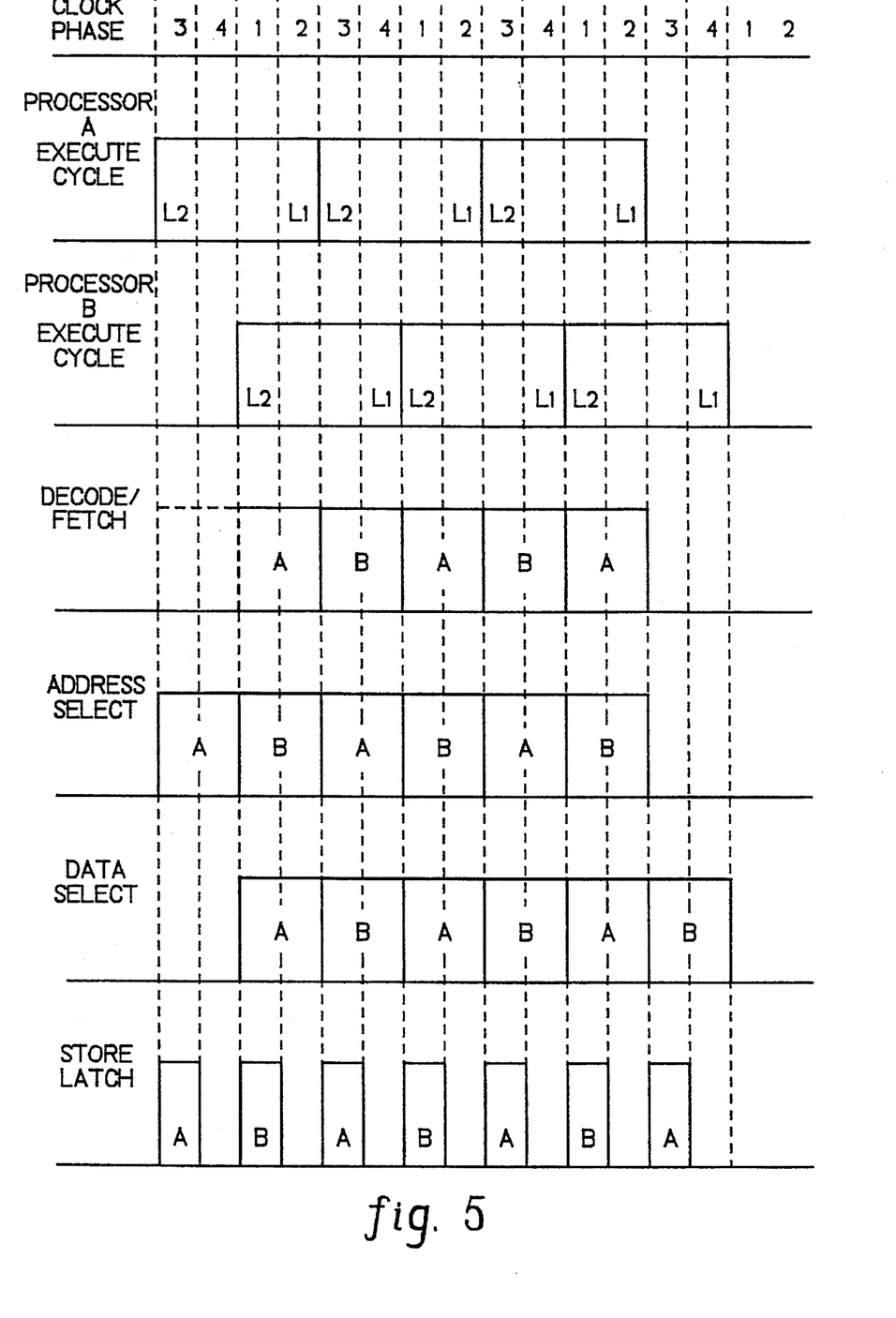
FIG. 5 is a timing diagram for one embodiment of the present invention, including the sequencing of operations of various elements of the dual, interleaved RISC-type architecture.

For example, referring to the timing diagram presented in FIG. 5, the L1/L2 clocks for a first processor engine (i.e., processor (A) execute cycle), are respectively driven by the phase 03 and phase 02 clocks (FIG. 4), while the second processor (processor (B) execute cycle) utilizes the phase 01 and phase 04 clocks (FIG. 4) to define a process cycle. For the processor (A) execute cycle, latch L1 receives phase 02 while latch L2 receives phase 03. Similarly, latch L2 for the processor (B) execute cycle receives the phase 01 clock while latch L1 thereof receives the phase 04 clock. As shown, the resulting machine cycles for processors (A) & (B) are substantially equal and 180° out of phase, but when averaged over time, 2X the throughput is roughly attained for one machine cycle. Also shown in FIG. 5 is a timing diagram for the decode and fetch phases of a dual interleaved RISC-type parallel processor pursuant to the present invention. Fetching and decoding of both processor (A) instructions and processor (B) instructions alternately occur within the same process cycle so that the same silicon can be used for both pipelines. The address select, data select and store latch timing diagrams are the corresponding control signals used by the dual interleaved RISC-type parallel processing structure 115 depicted in FIG. 6.

Figure 6:
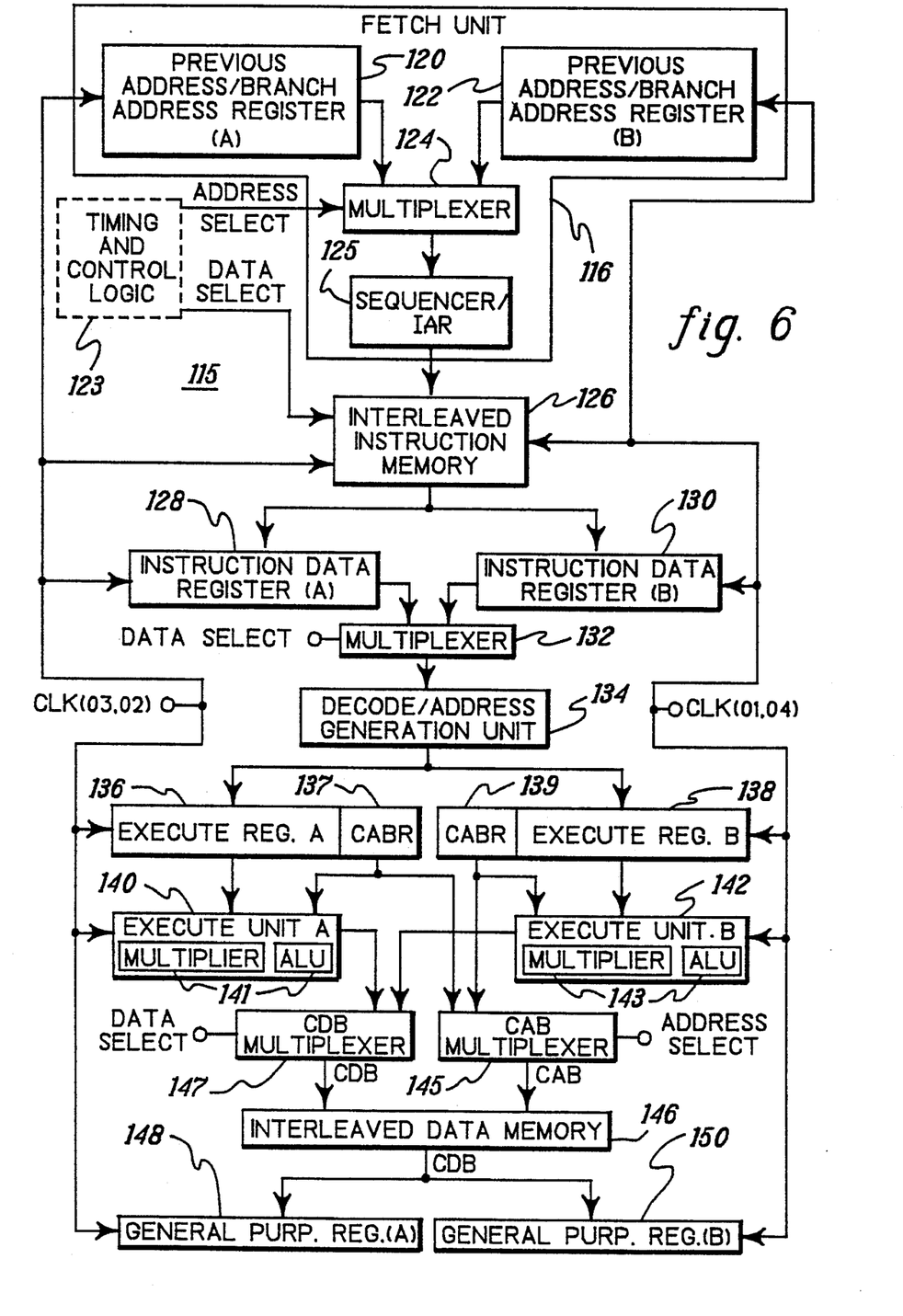
FIG. 6 is a block diagram representation of various elements of a dual, interleaved RISC-type architecture pursuant to the present invention, along with couplings to an interleaved instruction memory and an interleaved data memory.

Referring specifically to FIG. 6, structure 115 includes a hybrid fetch unit 116, which is similar to fetch unit 10 of the single processor embodiment of FIG. 1. However, unit 116 includes an instruction link register for both an (A) processing engine and a (B) processing engine in the dual interleaved structure 115. Specifically, previous address/branch address register (A) 120 and previous address/branch address register (B) 122 are provided for separately tracking the previous address and/or generated address for processing pipeline (A) and processing pipeline (B), respectively. The addresses latched to registers 120 and 122 are fed to a multiplexer 124 which is controlled by the address select signal (FIG. 5) generated by a timing and control logic 123. As shown in FIG. 5, the address select signal gates multiplexer 124 twice in one processing cycle so that both the address from register (A) 120 and register (B) 122 are output therethrough. This essentially means that fetch unit 116 is operating at twice the frequency of prior art fetch unit 10 in the processor embodiment of FIG. 1.

The multiplexed addresses are fed to a sequencer for incrementing, and subsequently to an instruction address register (IAR) 125. Instruction addresses latched in instruction address register 125 are used to access an interleaved instruction memory 126. Memory 126 is referred to as interleaved because data is read therefrom for both the (A) processing pipeline and the (B) processing pipeline in an alternating manner, with read data being indexed by the data select signal (FIG. 5) from logic 123. Instructions read from memory 126, which again is typically external to pipeline processor 115, are fed to either an instruction data register (A) 128 or an instruction data register (B) 130 depending upon whether the data select signal indexes the (A) processing pipeline or the (B) processing pipeline.

Figure 7:
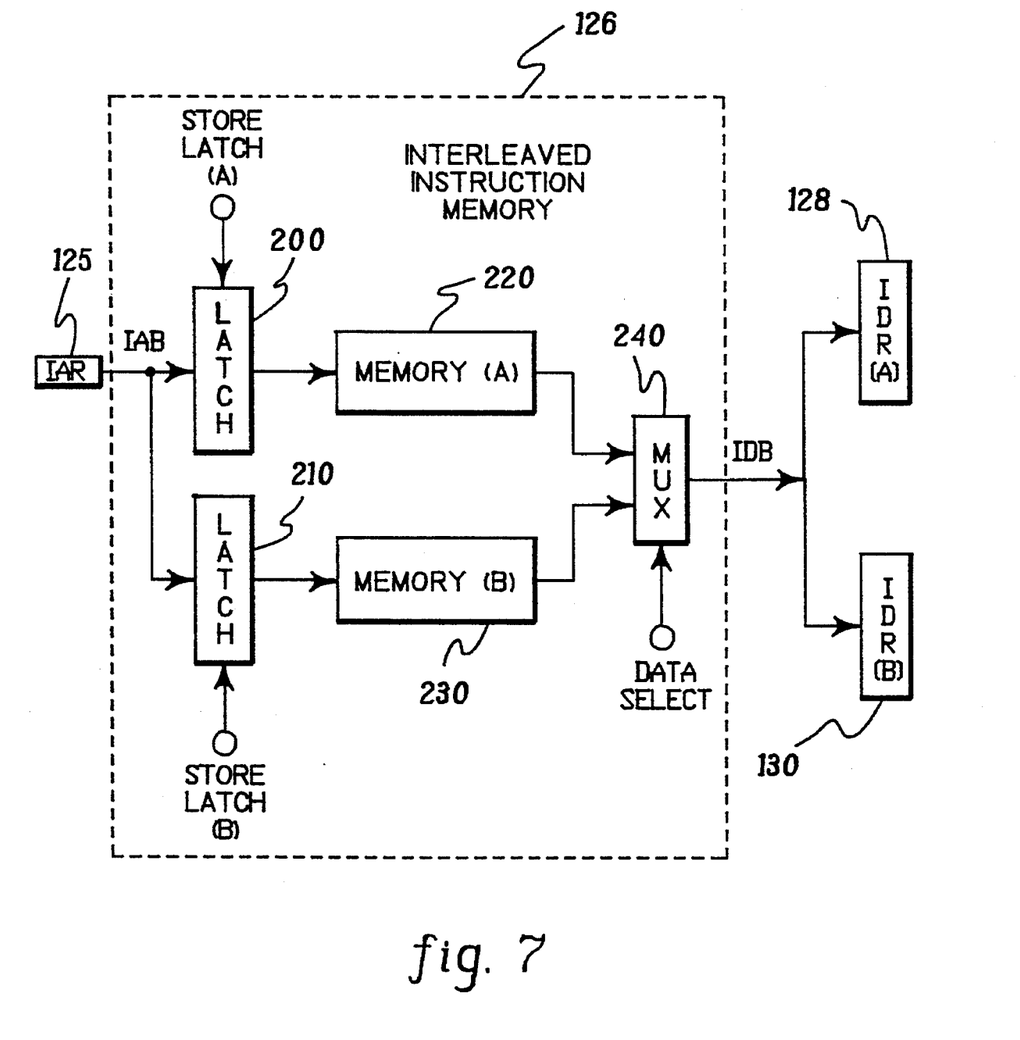
FIG. 7 is a block diagram representation of the interleaved instruction memory of FIG. 6.

FIG. 7 is a detailed block diagram for one embodiment of interleaved instruction memory 126. In this embodiment, instruction memory is physically divided into an (A) memory and a (B) memory. However, memory (A) and memory (B) could also be separate portions of the same memory or else could each comprise multiple memories. As shown, addresses are input to memory 126 from instruction address register 125 of fetch unit 116 (FIG. 6) across an instruction address bus (IAB). Each address is fed to two parallel latches 200 & 210, which are controlled by the store latch (A) clock signal and the store latch (B) clock signal, respectively, depicted in FIG. 5. These latched addresses are then used to access stored information in a corresponding one of instruction memory (A) 220 and instruction memory (B) 230. Information alternately retrieved from memories 220 & 230 is fed to a multiplexer 240 driven by the data select signal (FIG 5). In this way, data returned on the instruction data bus (IDB) to the interleaved parallel processor 115 is properly indexed to the appropriate data register, i.e., instruction data register (IDR (A)) 128 or instruction data register (IDR (B)) 130.

Returning to FIG. 6, during the next pipeline phase information is read from registers 128 & 130 by a decode/address generation unit 134 through a multiplexer 132, again which is gated by the data select signal (FIG. 5) generated by timing and control logic 123. Decode/address generation unit 134 is substantially identical to decode unit 20 of the single processor embodiment of FIG. 1. Again, however, unit 134 operates in this embodiment at twice the frequency of decode unit 20 (FIG. 1). Should unit 134 decode a fetched instruction as a branch instruction, an indexed address corresponding to the desired instruction branch is generated. The branch address is fed back to the appropriate register 120 or register 122 of fetch unit 116, for use in retrieving the desired information from interleaved instruction memory 126. Decoded instructions are appropriately latched to either execute register (A) 136 or execute register (B) 138.

During the execute phase of pipeline processing, dual execute processors (i.e., execute unit (A) 140 and execute unit (B) 142) read latched data from a corresponding one of execute register (A) 136 and execute register (B) 138. Registers 136 & 138 contain the control bits necessary for the execute phase of the pipeline processing. Associated with registers 136 and 138 are a common address bus register 137 and a common address bus register 139, respectively. Registers 137 & 139 latch either an address or immediate data from decode unit 134 for use in loading or storing information in an interleaved data memory 146. Latched information from both these registers is made available to the corresponding execute unit and to a common data bus multiplexer 147 (described below).

Execute units 140 & 142 include general purpose registers, status registers and execute logic such as a multiplier and ALU 141 & 143, respectively. As an enhanced embodiment of the interleaved architecture of the present invention, one or more components of the execute units (or more broadly, any component in the at least duplicate, parallel configured elemental unit of a pipeline pursuant to the present invention) can also be time shared, in a manner similar to the noted sharing of circuits in the fetch and decode phases. For example, a single multiplier or a single ALU may be used within structure 115, that is, assuming processing therethrough can be accomplished at substantially twice the speed of the remaining portions of the execute phase.

A first one of the dual multiplexers receiving information from registers 137 and 139 and/or units 140 and 142 comprises a common address bus (CAB) multiplexer 145, while the second mutliplexer functions as the common data bus (CDB) multiplexer 147. Multiplexer 145 is controlled by the address selection signal and multiplexer 147 by the data select signal (FIG. 5) from the timing and control logic. Immediate data can also be fed from registers 137 & 139 into the corresponding execute unit, while a decoded address is fed directly to the common address bus multiplexer 145.

Figure 8:
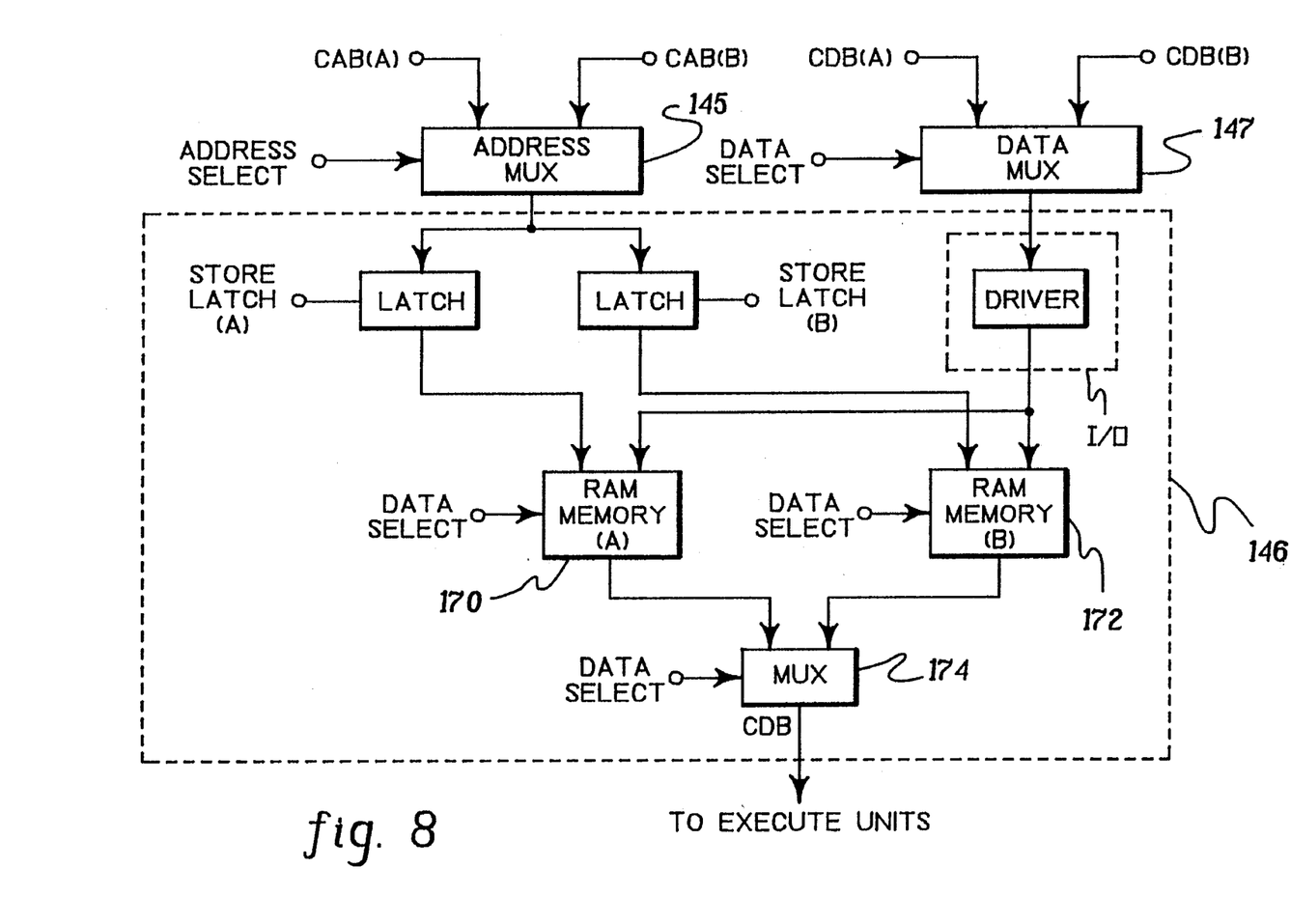
FIG. 8 is a block diagram representation of the interleaved data memory of FIG. 6.

In this way, both data and addresses are fed from multiplexers 145 and 147 into memory 146, for example, to accomplish a store operation. If information is read from memory 146, the information is returned to the appropriate execute unit 140 or 142 across the common data bus (CDB), and in particular to either a general purpose register (A) 148 or a general purpose register (B) 150 of execute unit (A) or execute unit (B), respectively. FIG. 8 depicts in detail one embodiment for an external interleaved data memory 146.

As shown, address multiplexer 145 receives both the common address bus CAB (A) for the (A) processing pipeline and the common address bus CAB (B) for the (B) processing pipeline as inputs, and multiplexes between the addresses carried by the two buses under control of the address select signal (FIG. 5). Again, the address select signal (as well as the data select signal) is driven at twice the cycle time of the execute units. The output of address multiplexer 145 is fed into interleaved data memory 146 and, in particular, to two parallel connected latches which are respectively driven by the store latch (A) signal and store latch (B) signal (FIG. 5). The output of each latch is coupled to random access memory (A) 170 or random access memory (B) 172. Memories 170 & 172, which are driven by the data select signal (FIG. 5), can comprise different portions of the same memory or can each be divided into one or more separate memories.

Assuming a write operation, data multiplexer 147 receives as input the common data bus CDB (A) for the (A) processing pipeline and the common data bus CDB (B) for the (B) processing pipeline, and its output is controlled by the data select signal (FIG. 5). After passing through a common I/O, which includes a driver circuit, the indexed data signals are input to the appropriate one of random access memories 170 & 172. Should a read operation be processed, the appropriate output of memory 170 or 172 is multiplexed in a multiplexer 174 before being passed across the common data bus (CDB) to the corresponding pipeline processor, and in particular to the appropriate general purpose register 148 or 150 (FIG. 6). Data passing through multiplexer 174 is indexed by the data select signal of (FIG. 5) produced by the timing and control logic.

Those skilled in the art will note from the above description that by providing multiples of the slowest elemental units in a RISC-type architecture, significantly improved processing throughput is obtained. Specifically, speeds of twice or more those previously attainable for the same basic processor technology and the same instruction set are possible. Further, this increased processing speed is attained with substantially less than double (or more) the chip area increase otherwise required by the prior art processor technology. For example, in one actual implementation, twice the speed is achieved with only 50% more silicon consumption in comparison with prior art RISC-type architectures.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A computer for parallel, pipelined processing of multiple instructions from n separate instruction sets, where n is a positive integer $\geq 2$, each instruction set including multiple instructions, the multiple instructions of each instruction set being phase offset from the multiple instructions of each other instruction set of the n separate instruction sets, said computer comprising:

an instruction fetch unit for fetching computer instructions from each of said n instruction sets, said instruction fetch unit having a fetch clock associated therewith;

an instruction decode unit for decoding fetched instructions, said instruction decode unit having a decode clock associated therewith;

n execute units, coupled in parallel to receive decoded instructions from said instruction decode unit, for executing instructions decoded by said instruction decode unit, each of said n execute units having an execute clock associated therewith and each executing only decoded instructions from a corresponding one of said n separate instruction sets; and timing and control means, coupled to said instruction fetch unit, instruction decode unit, and n execute units, for controlling the timing and sequence of operations on instructions from said n separate instruction sets such that said fetch clock and said decode clock operate at least n times faster than said execute clock, and such that n instructions, each from a different one of the n instruction sets, are separately handled by said instruction fetch unit, said instruction decode unit and said n execute units, said n execute units handling said n instructions in a substantially parallel, interleaved manner, within one period of the execute clock, each execute unit of said n execute units operating phase offset from each other execute unit of said n execute units.

2. The computer of claim 1, wherein said timing and control means controls the operations of said n execute units such that the execute clock associated with one of said n execute units is phase offset by 1/n x 360° from the execute clock associated with at least one other of said n execute units.

3. The computer of claim 2, wherein n equals two, said computer including a first execute unit and a second execute unit, and wherein the execute clock associated with said first execute unit is phase offset 180° from the execute clock associated with said second execute unit, such that decoded instructions are processed in a substantially parallel, interleaved manner through said first and second execute units.

4. The computer of claim 3, wherein said n instruction sets comprise a first instruction set and a second instruction set, and wherein said fetch clock is such that said instruction fetch unit fetches an instruction from said first instruction set and an instruction from said second instruction set at least twice as fast as a period of the execute clock associated with each of said n execute units.

5. The computer of claim 4, wherein said second clock is such that said instruction decode unit decodes both a fetched instruction from said first instruction set and a fetched instruction from said second instruction set at least twice as fast as the period of the execute clock associated with each of said n execute units.

6. The computer of claim 2, wherein n equals three such that said computer includes a first execute unit, a second execute unit, and a third execute unit, and wherein the execute clock associated with said second execute unit differs in phase by 120° from the execute clock associated with said first execute unit and wherein the execute clock associated with said third execute unit differs in phase by 120° from the execute clock associated with said second execute unit, such that decoded instructions are processed in a substantially parallel, interleaved manner through said three execute units.

7. The computer of claim 2, wherein n equals four such that said computer includes a first execute unit, a second execute unit, a third execute unit, and a fourth execute unit, and wherein the execute clock associated with said second execute unit differs in phase by 90° from the execute clock associated with said first execute unit, the execute clock associated with said third execute unit differs in phase by 90° from the execute clock associated with said second execute unit, and the execute clock associated with said fourth execute unit differs in phase by 90° from the execute clock associated with said third execute unit, such that decoded instructions are processed in a substantially parallel, interleaved manner through said four execute units.

8. The computer of claim 1, wherein said instruction fetch unit includes n instruction link registers, each of said n instruction link registers latching instruction addresses for the multiple instructions from a corresponding one of said n instruction sets.

9. The computer of claim 8, wherein said instruction fetch unit further includes a multiplexer coupled to said n instruction link registers, said multiplexer being controlled by an address select signal from said timing and control means, said address select signal controlling said multiplexer so as to alternately output addresses latched in said n instruction link registers.

10. The computer of claim 1, wherein said n instruction sets are stored in interleaved instruction memory, and wherein said instruction fetch unit includes means for fetching instructions from said interleaved instruction memory.

11. The computer of claim 1, further including a common address bus multiplexer and a common data bus multiplexer, and wherein said computer is connected to interleaved data memory via a common address bus and a common data bus, said n execute units each being coupled to said common address bus multiplexer and to said common data bus multiplexer for communicating with said interleaved data memory across said common address bus and said common data bus.

12. A computer configured for parallel, pipelined processing of multiple instructions from at least two separate instruction streams, each instruction stream including multiple instructions, the multiple instructions of each instruction stream being phase offset from the multiple instructions of each other instruction stream of the at least two instruction streams, said computer comprising:

a plurality of units of different types interconnected in a pipeline configuration, said units of different types including a fetch unit, a decode unit and an execute unit, each fetch unit having a fetch clock associated therewith, each decode unit having a decode clock associated therewith, and each execute unit having an execute clock associated therewith;

at least two execute units being provided in parallel configuration within the interconnected pipeline configuration, each of said at least two execute units processing instructions only from a corresponding one of the at least two separate instructions streams; and wherein the execute clock associated with each execute unit has a longer cycle than the fetch clock associated with each fetch unit and than the code clock associated with each decode unit, and wherein said at least two execute units provided in parallel configuration within the interconnected pipeline configuration execute instructions phase offset from each other execute unit of the at least two execute units and provide interleaved outputs of processed instructions from the at least two separate instruction streams.

13. The computer of claim 12, wherein the execute clock associated with each execute unit is twice as slow as the fetch clock associated with each fetch unit and the decode clock associated with each decode unit, and wherein the fetch clock has a period that is equal in length to a period of the decode clock.

14. The computer Of claim 13, wherein the multiple instructions of each instruction stream of the at least two separate instruction streams are phase offset 180° from the multiple instructions of each other instruction stream of the at least two instruction streams, and wherein the interleaved outputs of the at least two execute units are 180° out of phase.

15. A method for processing instructions from n separate instruction sets, wherein n is an integer $\geq 2$, through a pipeline processor having at least fetch, decode and execute phases, said execute phase being accomplished with n parallel connected execute units, each of said n execute units operating at substantially the same execute cycle time and operating phase offset from each other of said n execute units, said method for processing instructions comprising the steps of:

(a) fetching a first series of n instructions, each instruction of said first series of n instructions being fetched from a different one of said n instruction sets, said fetching being performed according to a fetch clock;

(b) decoding said fetched first series of n instructions while simultaneously fetching a second series of n instructions, each of said n instructions of said second series being fetched from a different one of said n instruction sets said decoding being performed according to a decode clock;

(c) using said n execute units to execute said decoded first series of n instructions according to an execute clock, while simultaneously decoding said second series of n instructions and fetching a new first series of n instruction, said executing step (c) including using each of said n execute units to only execute instructions from a corresponding one of said n instruction sets;

(d) using said n execute units to execute said decoded second series of n instructions according to said execute clock, while simultaneously decoding said new first series of n instructions and fetching a new second series of n instructions, said executing step (d) including using each of said n execute units to only execute instructions from a corresponding one of said n instruction sets; and (e) repeating steps (c) & (d) for a plurality of first series of n instructions and second series of n instructions, wherein said fetch clock and said decode clock are at least n times faster than said execute clock such that n instructions from the n separate instruction sets are separately processed in interleaved, hybrid parallel pipeline fashion, wherein each execute unit of said n execute units processes instruction phase offset from each other execute unit of said n execute units.

16. The processing method of claim 15, wherein said executing steps include using said n execute units to process said instructions such that the execute clocks associated with said n execute units differ in phase, said phase difference being 1/n times 360°.

* * * * *

UNITED STATES PATENT AND TRADEMARK OFFICE
CERTIFICATE OF CORRECTION

PATENT NO. : 5,459,843
DATED : Oct. 17, 1995
INVENTOR(S) : Davis et al.

It is certified that error appears in the above-indentified patent and that said Letters Patent is hereby corrected as shown below:

<u>In the Claims</u>:

Column 10, line 7, delete "code" and substitute therefor --decode--.

Column 10, line 21, delete "Of" and substitute therefor --of--.

Signed and Sealed this

Thirteenth Day of February, 1996

Attest:

BRUCE LEHMAN

*Attesting Officer*  *Commissioner of Patents and Trademarks*